United States Patent [19]

Fujiwara et al.

[11] Patent Number: 4,637,222

[45] Date of Patent: Jan. 20, 1987

[54] REFRIGERATOR FOR VEHICLE

[75] Inventors: Kenichi Fujiwara, Kariya; Hideo Asano, Gifu; Eiichi Hasada, Okazaki; Kazuhisa Makida, Kariya; Akinori Iida, Nishio, all of Japan

[73] Assignee: Nippondenso Co., Ltd., Kariya, Japan

[21] Appl. No.: 727,264

[22] Filed: Apr. 25, 1985

[30] Foreign Application Priority Data

Jun. 8, 1984 [JP] Japan .................. 59-118879
Dec. 27, 1984 [JP] Japan .................. 59-276721

[51] Int. Cl.⁴ .............................................. F25D 3/08
[52] U.S. Cl. ...................................... 62/244; 62/298; 62/430; 62/457
[58] Field of Search .............. 62/244, 457, 298, 448, 62/439, 430, 199; 165/41

[56] References Cited

U.S. PATENT DOCUMENTS

| | | | |
|---|---|---|---|
| 1,938,141 | 12/1933 | Goldkind | 62/448 X |
| 2,002,444 | 5/1935 | Woodruff | 62/430 |
| 3,505,830 | 4/1970 | Koerner | 62/244 X |
| 3,850,006 | 11/1974 | Redfern et al. | 62/216 |
| 3,858,405 | 1/1975 | Manzke | 62/196 |
| 3,872,686 | 3/1975 | Patrie | 62/448 X |
| 3,916,639 | 11/1975 | Atkinson | 62/244 X |
| 4,103,510 | 8/1978 | Hall | 62/299 |
| 4,483,151 | 11/1984 | FUjioka et al. | 62/157 |
| 4,545,211 | 10/1985 | Gaus | 62/244 X |

FOREIGN PATENT DOCUMENTS

| | | | |
|---|---|---|---|
| 0099108 | 1/1984 | European Pat. Off. | 62/448 |
| 981668 | 1/1949 | France | 62/448 |

Primary Examiner—William E. Wayner
Attorney, Agent, or Firm—Cushman, Darby & Cushman

[57] ABSTRACT

A refrigerator for vehicles has a cooling unit and a cool-keeping container adapted to be detachably connected to the cooling unit and contain goods to be cooled. The cooling unit includes a refrigerator evaporator connected to a refrigeration cycle of an automotive airconditioning refrigeration cycle on a vehicle and a coldness accumulating medium supported in heat exchange relationship with the evaporator. During evaporator operation, the coldness is accumulated in the coldness-accumulating medium and simultaneously transferred to the goods in the cool-keeping container. When the goods are cooled to a desired temperature, the cool-keeping container can be disconnected from the cooling unit and taken out of the vehicle with a heat insulating lid closing an opening formed in the container for the insertion and removal of the goods into and out of the container.

22 Claims, 33 Drawing Figures

FIG. II

REFRIGERATOR FOR VEHICLE

FIELD OF THE INVENTION

The present invention relates to a refrigerator for vehicles equipped with air-conditioners including air-conditioning refrigeration cyles. The refrigerator according to the present invention is particularly useful with, but not restrictively, vehicles of the class that is designed mainly for leisure time amusement.

DESCRIPTION OF THE PRIOR ART

The refrigerators for vehicles proposed in the past are generally classified into two types one of which utilizes cooled air received from an automotive air-conditioner or cooler and the other of which has an auxiliary refrigerator evaporator connected to an automotive air-conditioner refrigeration cycle.

The prior art refrigerators of the specified class, however, are effective to provide cooling operations only when the associated vehicles are operated because the air-conditioner refrigeration cycles of the vehicles are driven by the engines of the vehicles. Thus, if a vehicle is parked under a blazing sun in a summer day, the temperature within the refrigerator is raised to a high level in a short period of time. In addition, the refrigerator is coupled to the air-conditioning system and thus cannot be taken out of the vehicle.

SUMMARY OF THE INVENTION

The present invention has its object to provide a refrigerator for a vehicle which is operative to keep goods cool for a long time even if the vehicle is parked in a sunny day and which is portable away from the vehicle as required.

It is another object of the present invention to provide a refrigerator for a vehicle which is of a coldness-accumulation type and which, however, is simple in structure and is of a light weight.

The refrigerator according to the present invention is for use with a vehicle equipped with an air-conditioner having a refrigeration cycle and comprises:

a cooling unit including a casing of a heat-insulating structure, a refrigerator evaporator disposed in the casing and adapted to be connected to the air-conditioner refrigerator cycle, a coldness-accumulating medium to be cooled by the refrigerating evaporator and means in the casing for supporting the coldness-accumulating medium in heat exchange relationship with the refrigerator evaporator;

the cooling unit being adapted to be secured to the vehicle body;

a portable cool-keeping container of a heat-insulating structure adapted to be detachably connected to the cooling unit and removably accommodate goods to be cooled; and means for transferring the coldness from the cooling unit casing into the cool-keeping container when the latter is connected to the cooling unit and the refrigerator is in operation.

When the cool-keeping container is connected to the cooling unit and the refrigerator is operated, the refrigerator evaporator in the cooling unit casing is operative to cool not only the coldness accumulating medium in the cooling unit casing but also the goods in the cool-keeping container whereby, even if the air-conditioning system is stopped due, for example, to a parking of the vehicle, the goods in the cool-keeping container can be kept cool by the coldness accumulated in the coldness-accumulating medium in the cooling unit casing. The cool-keeping container can be disconnected from the cooling unit and is conveniently portable away from the vehicle with cooled goods retained in the container. The detachable cool-keeping container provides another advantage that it can be disconnected from the cooling unit to provide a greater space in the vehicle when refrigeration of goods is not required.

The above and other objects, features and advantages of the invention will be made more apparent by the following description with reference to the accompanying drawings.

DESCRIPTION OF PREFERRED EMBODIMENTS

Figure 1:
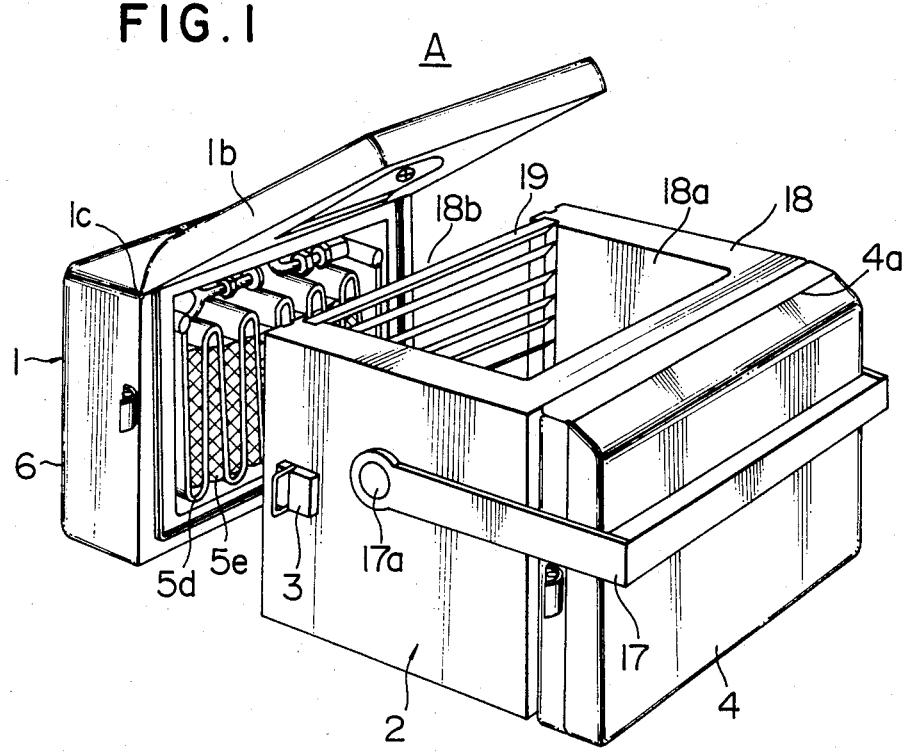
FIG. 1 is a perspective view of an embodiment of a refrigerator for vehicle according to the present invention with a cool-keeping container being shown in disconnected position.
Figure 2:
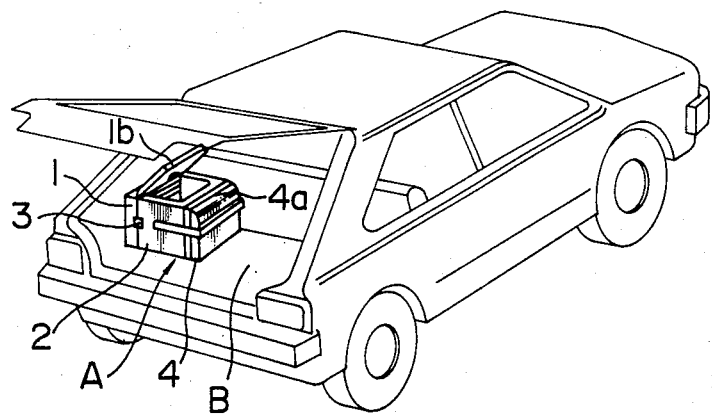
FIG. 2 is a rear perspective view of a vehicle showing the refrigerator in the vehicle.

FIG. 2 shows an embodiment of the refrigerator A as being mounted in a rear baggage compartment of a vehicle and includes a cooling unit 1 secured to the vehicle body by means of conventional securing means such as stays, not shown. The refrigerator A further includes a cool-keeping unit or container 2 adapted to be detachably connected to the cooling unit 1 by means of clamps 3, as will be seen in FIGS. 1 and 3. The cool-keeping container 2 is provided with two openings 18a and 18b formed in a side and the top of the container and adapted to be closed by a pair of lids generally designated by 4 when the cool-keeping unit 2 is disconnected from the cooling unit 1 and used merely as a cool-keeping container or box. The pair of lids 4 are foldably connected together along a hinge or fold line 4a. The opening 18a in the container 2 is for the insertion of goods to be cooled into the container 2 and for the removal of the goods therefrom. When the cool-keeping unit 2 is connected to the cooling unit 1, the other opening 18b is disposed in face-to-face contacting relationship with an open side of the cooling unit 1.

Figure 3:
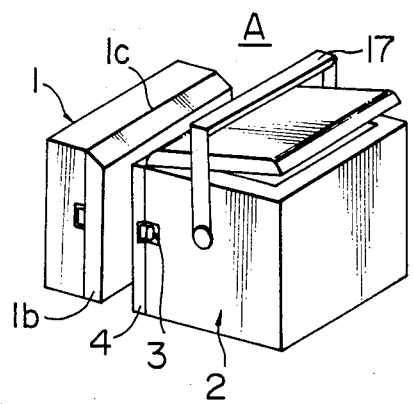
FIG. 3 is a perspective view of the refrigerator with the cool-keeping container being shown as being disconnected from a cooling unit and closed by lids so that the cool-keeping container is portable away from the vehicle.

FIG. 1 shows the cooling unit 1 and the cool-keeping unit 2 when the latter is going to be connected to the cooling unit 1. FIG. 3 shows the cooling unit 1 and the cool-keeping unit 2 when the latter is disconnected from the cooling unit 1 and the openings 18a and 18b are closed by the lids 4 so that the cool-keeping unit 2 is ready for use as a portable cool-keeping container. When the cool-keeping container 2 is disconnected from the cooling unit 1, the opening in the cooling unit 1 is closed as shown in FIG. 3 by a door 1b pivotally or hingedly connected to the top of the unit 1 by means of a hinge 1c. The cooling unit 1 when closed by the door 1c provides a good appearance and does not occupy a large space within the baggage compartment of the vehicle.

Figure 4:
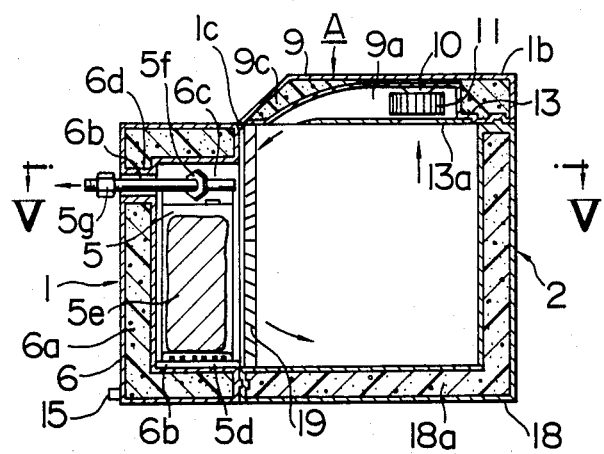
FIG. 4 is a vertical sectional view of the refrigerator.
Figure 5:
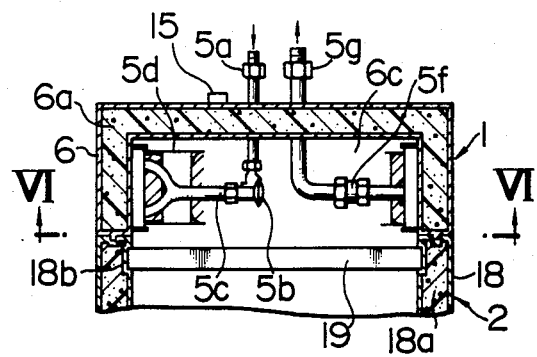
FIG. 5 is a fragmentary sectional view of the refrigerator taken along line V—V in FIG. 4.
Figure 6:
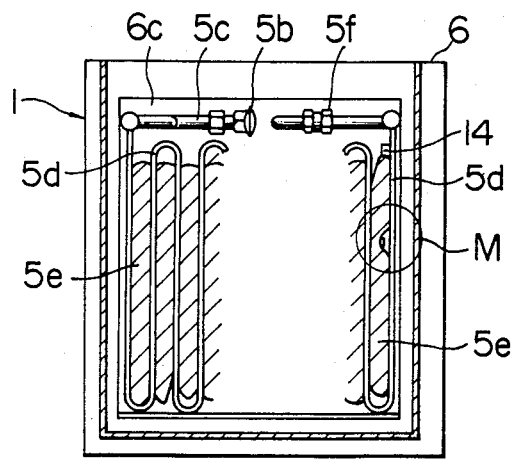
FIG. 6 is a sectional view of the refrigerator taken along line VI—VI in FIG. 5.

Referring to FIGS. 4, 5 and 6, the cooling unit 1 comprises a cooling system 5 and a casing 6 having a recess 6c for accommodating the cooling system 5 and a pair of through-holes 6d only one of which is shown in FIG. 4. The through-holes 6d are provided for the pipings of the cooling system 5. The latter is disposed in the recess 6c and secured to the casing 6 by conventional securing means such as stays, not shown. The casing 6 is of a heat-insulating structure formed by outer layers of a moulded plastic material and an inner heat-insulating layer 6a of a heat-insulating material such as foamed hard urethane formed by injection molding.

The cooling system 5 comprises a high pressure piping 5a, an expansion valve 5b connected to the piping 5a and adapted to be opened at a predetermined pressure such as, for example, 1.2 kg/cm$^2$G, a branch tube 5c connected at one end to the expansion valve 5b, a refrigerator evaporator 5d formed by a plurality of zigzag turns of a tube having a substantially elongated or flat cross-section and connected at one end to the downstream end of the branch tube 5c, a coldness accumulator 5e in the form of a plurality of packages of coldness accumulating medium each disposed in heat exchange relationship with and held between adjacent turns of the piping of the evaporator 5d, a check valve 5f connected to the downstream end of the evaporator 5d and a low pressure piping 5g. In the illustrated embodiment of the invention, the coldness accumulating medium packages are each formed by a deformable bag of a heat conductive material such as aluminum foil filled with water and adapted to be cooled by the refrigerator 5d to the freezing temperature of water so that, when the refrigerant is not circulated through the evaporator, the coldness accumulator 5e is operative to keep the interior of the refrigerator at a low temperature. The space between the casing 6 and the cooling system 5 is filled with a packing material 6b.

Figure 7:
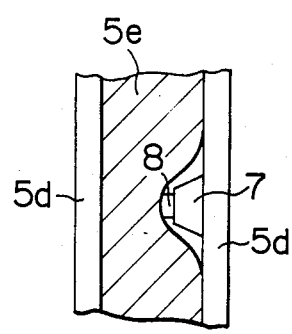
FIG. 7 is an enlarged fragmentary view of the refrigerator showing the structural details of the part encircled by a circle M in FIG. 6.
Figure 8:
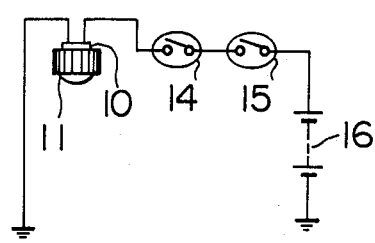
FIG. 8 shows an electrical circuit for a fan motor.

The surface temperature of the heat accumulating medium package 5e which disposed in contact with the most downstream turn of the evaporator piping is measured by a temperature sensor such as thermistor 8 to detect the level of the coldness accumulated in the coldness acculator. The thermistor 8 is mounted on the most downstream section of the evaporator piping via a heat insulating material such as a plastic material having a high heat insulating property, as shown in FIG. 7.

The door 1b of the cooling unit 1 is formed by an outer frame 9 of a moulded plastic material filled with a heat insulating material 9b such as injection-moulded foamed hard urethane, an inner frame 13 of a moulded plastic material covering the heat insulating material 9b and secured to the outer frame 9 by screws, not shown, a motor 10 and a sirocco fan 11. The door 1b is shaped such that a recess 9a is formed in the inner frame 13 to define a scroll section and an air outlet for the sirocco fan 11. An air suction opening 13a is formed in the inner frame 13.

The motor 10 is secured to the door 1b by means of a bracket, not shown, and is adapted to be supplied with electric current from an electrical power source or batteries 16 through first and second temperature sensitive switches 14 and 15 such as thermal lead switches. The first switch 14 is disposed in contact with the evaporator 5d, as shown in FIG. 6, and adapted to be closed when the surface temperature of the evaporator 5d is lowered to a predetermined temperature level such as 0° C., and to be closed when the evaporator surface temperature rises to another predetermined lower temperature level such as 5° C. The second switch 15 is attached to the outer surface of the casing 6, as shown in FIGS. 4 and 5, and adapted to be closed when the temperature around the refrigerator rises to a predetermined level such as 35° C., and to be opened when the temperature is lowered to another predetermined lower level such as 30° C. The arrangement is such that, when the coldness accumulating medium in the coldness accumulator 5e is frozen and the temperature around the refrigerator is at a higher level, the motor 10 is energized to drive the fan 11 to positively circulate cooled air through the interior of the refrigerator.

Figure 9:
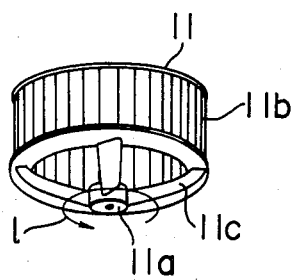
FIG. 9 is a perspective view of the fan.
Figure 10:
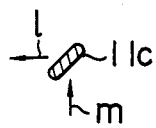
FIG. 10 is an enlarged sectional view of an arm of the motor shown in FIG. 9.

The sirocco fan 11 is formed of a moulded plastic material and has a hub section 11a to be connected with a shaft of the motor 10, a fan blade section 11b and arms 11c interconnecting the hub and blade sections 11a and 11b, as shown in FIG. 9. The fan 11 is mounted such that the arms 11c are disposed adjacent to the air suction opening 13a and the air is sucked into the fan 11 through the openings defined between the arms 11c. Each of the arms 11c has an generally elongated cross section extending obliquely relative to the direction of the air flow into the fan 11 indicated by an arrow m in FIG. 10 so that the arms do not interfere with the air flow into the fan. The direction of rotation of the fan 11 is indicated by another arrow l in FIGS. 9 and 10.

The cool-keeping unit 2 is formed by a casing 18 in which the openings 18a and 18b are formed in two sides, a louver 19 disposed in the opening 18b and a handle 17 pivotally connected at 17a to closed sides of the casing 18. The latter is formed of a moulded plastic material filled with foamed hard urethane 18a. The louver 19 is also formed of a moulded plastic material and has a plurality of horizontal louver vanes or blades which not only operate to uniformalize the flow of air circulated within the refrigerator but also prevent cooled goods from dropping off the cool-keeping unit 2 when the latter is disconnected from the cooling unit 1.

The lids 4 are also formed of a moulded plastic material and each filled with a heat insulating material such as foamed hard urethane as is the casing 18.

Figure 11:
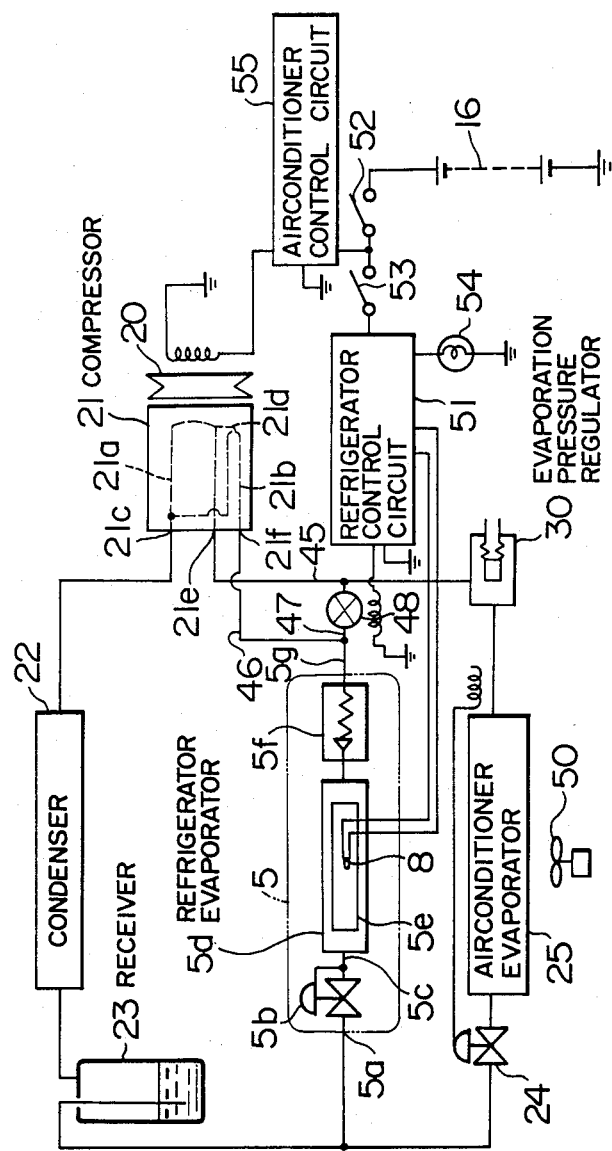
FIG. 11 diagrammatically illustrates a refrigeration cycle and an associated electrical circuit.

FIG. 11 shows a refrigeration cycle to which the refrigerator according to the present invention is adapted to be operatively connected. A compressor 21 is adapted to be drivingly connected through an electromagnetic clutch 20 to an automotive engine mounted on a vehicle on which the refrigerator is mounted. In the illustrated embodiment of the invention, the compressor is of the swash plate type and has a plurality of cylinders (10 cylinders, for example), nine cylinders forming a main compression section 21a used for the airconditioning purpose and the remaining one cylinder forming an auxiliary compression section 21b used for the refrigeration purpose. The main and auxiliary compression sections 21a and 21b are respectively provided with independent refrigerant inlets 21e and 21f so that the respective compression sections 21a and 21b can have different suction or inlet pressures set.

Return flows of refrigerant from the air-conditioner and refrigerator evaporators 25 and 5d are sucked through the inlets 21e and 21f into the main and auxiliary compression sections 21a and 21b, respectively. The air-conditioning refrigerant is compressed in the main compression section 21a. However, a part of the air-conditioning refrigerant flows through the communication passage 21d into the auxiliary compression section 21b in the final stage of its suction stroke and is mixed with the refrigerating refrigerant in the auxiliary compression section 21b so that the refrigerant pressure therein is raised substantially to the pressure level of the air-conditioning refrigerant at the inlet 21e. The compression stroke of the auxiliary compression section 21b is commenced from this raised pressure level of the refrigerant therein. The structural details of the compressor 21 are fully disclosed in earlier Application Ser. No. 643,382 filed Aug. 23, 1984 by FUJIWARA et al.

The disclosure in the co-pending earlier application referred to is incorporated herein by reference.

The discharge port 21c of the compressor 21 is connected to an inlet of a condenser 22 having its outlet port connected to a receiver 23. The outlet of the receiver 23 is connected to an airconditioning pressure reducing means in the form of a temperature responsive expansion valve 24 which in turn is connected to an airconditioner evaporator 25. An air blower 50 is disposed on one side of the evaporator 25 to cause airconditioning air to flow therethrough. The outlet port of the evaporator 25 is connected through an evaporation pressure regulator 30 and through an airconditioning refrigerant return line 45 to the main refrigerant inlet 21e of the compressor 21. The pressure regulator 30 is operative to provide a predetermined evaporation pressure for the evaporator 25 to prevent the formation of frost thereon.

The expansion valve 5b, the refrigerator evaporator 5d and the check valve 5f of the cooling system 5 of the afore-mentioned cooling unit 1 of the refrigerator are disposed in parallel relationship with the airconditioning expansion valve 24 and evaporator 25. The check valve 5f is operative to allow the refrigerating refrigerant to flow only from the refrigerator evaporator 5d toward the compressor 21. For this purpose, the low pressure piping 5g is connected through a return pipe ling 46 to the auxiliary inlet 21f of the compressor 21.

The expansion valve 5b is designed to be opened when the refrigerant pressure in the refrigerator evaporator 5d is lowered to a predetermined level such as 1.2 kg/cm$^2$G which corresponds to an evaporation pressure of $-10.5°$ C. in the case where the refrigerant is R12.

A pipe line 47 is provided between the air-conditioning refrigerant return pipe line 45 and the refrigerating refrigerant return pipe line 46. A solenoid valve 48 is provided on the pipe line 47 and adapted to be opened to communicate the refrigerant return pipe lines 45 and 46 together.

The electric circuit for the refrigeration cycle includes a refrigerator control circuit 51 electrically connected through an airconditioner switch 52 and a refrigerator switch 53 to the batteries. The refrigerator control switch 51 is electrically connected to the aforementioned temperature sensor 8 which has been described as being sensitive to the surface temperature of the coldness accumulator 5e cooled by the refrigerator evaporator 5d. When the temperature detected by the temperature sensor 8 is lowered below a first predetermined level ($-6°$ C. for example), the circuit 51 interrupts the electrical suppy to the solenoid valve 48 so that the latter is opened to connect the refrigerant return lines 45 and 46 together. When the temperature detected by the temperature sensor 8 is lowered to a second predetermined level ($-4°$ C. for example) which is slightly higher than the first predetermined temperature level, the control circuit 51 lightens an indicator 54, such as an electrical lamp or LED, to indicate that the coldness accumulating medium has been frozen. The indicator 54 is disposed on the outer surface of the cooling unit of the refrigerator or in the instrument panel of the automobile on which the regrigerator is mounted.

The airconditioner control circuit 55 is operative to electrically energize the coil of the electromagnetic clutch 20 when the switch 52 is closed so that the compressor 21 is drivingly connected through the clutch to an associated engine.

Figure 12:
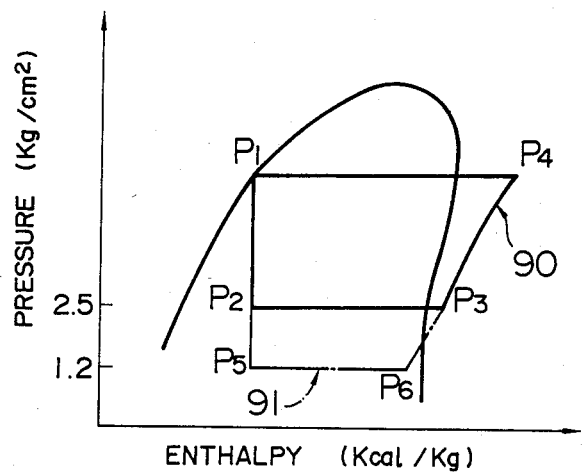
FIG. 12 is a Mollier chart of the refrigeration cycle.

FIG. 12 is a Mollier chart of the refrigeration cycle, wherein the solid line 90 indicates the oepration characteristic of the airconditioning refrigeration cycle while the broken line 91 indicates the operation characteristic of the refrigerating refrigeration cycle.

In operation, when the airconditioner switch 52 is closed, the airconditioner control switch 55 energizes the electromagnetic clutch 20 so that the latter is engaged to drivingly connect the compressor 21 to the engine whereby the compressor operation is started to compress the refrigerant which is in its gas phase.

With the compressor being in operation, when the refrigerator switch 53 is closed, the refrigerator control circuit 51 is supplied with electric current. The surface temperature of the coldness accumulator 5e is initially at a level higher than the predetermined level ($-6°$ C. for example). Thus, the output emitted to the solenoid valve 48 from the control circuit 51 as a result of the comparison between the signal from the temperature sensor 8 and a reference signal set in the control circuit 51 is at a "High" level, so that the solenoid valve 48 is kept closed. In addition, the indicator 54 is kept deenergized. The solenoid valve 48, therefore, isolates the refrigerant return pipe lines 45 and 46 one from the other, so that the airconditioning refrigerant is returned through the return line 45 back to the main inlet 21e of the compressor 21 while the refrigerating refrigerant flows through the return line 46 to the auxiliary compressor inlet 21f.

The auxiliary or refrigerating compression section 21b is communicated through the communicating passage 21d in the compressor 21 with the main or air-conditioning compression section 21a at the final stage (or at the bottom dead center) of the suction stroke of the compression section 21b, as fully disclosed in the copending earlier application referred to above. Therefore, the pressure in the refrigerating compression section 21b at its bottom dead center is raised to a level substantially equal to the pressure level in the airconditioning compression section 21a because the high pressure refrigerant from the airconditioning refrigerant circuit is introduced into the refrigerating compression section 21b. In other words, the pressure level P6 in the chart in FIG. 12 rises to the pressure level P3 which is substantially 2.5 kg/cm$^2$G. Accordingly, the airconditioning and refrigerating compression sections 21a and 21b of the compressor 21 both start compression strokes from 2.5 kg/cm$^2$G (see the pressure rise from P3 to P4 in FIG. 12). The compressed refrigerant gases from the two compression sections 21a and 21b are mixed together in the compressor 21 and discharged through the common discharge port 21c into the condenser 22 in which the refrigerant gases are cooled (see the change from point P4 to point P1 in FIG. 12).

The cooled refrigerant is liquified in the condenser 22 and the liquid refrigerant is stored in the receiver 23 and flows therefrom into the air conditioning and refrigerating circuits. More specifically, the expansion valves 24 and 5b disposed just upstream of the airconditioning and refrigerating evaporators 25 and 5d, respectively, are operative to lower the pressure from the level P1 to P2 and from P1 to P5, respectively. Thus, the flows of the liquid refrigerant enter the air-conditioning and refrigerator evaporators 25 and 5d at pressure levels of P2 and P5, respectively. The refrigerant is then evaporated in the evaporators 25 and 5d (see changes from P2 to P3 in evaporator 25 and from P5 to P6 in evaporator 5d). Accordingly, the refrigerant in the refrigerator evaporator 5d is kept at the pressure level of P5, i.e., 1.2 kg/cm$^2$G which is low enough to provide an evaporation temperature of $-10.5°$ C. which in turn is low enough to refrigerate or cool the coldness accumulator 5e in the refrigerator.

More specifically, the mass of the packed coldness accumulating medium disposed adjacent to the inlet of the refrigerator evaporator 5d is first cooled to its freezing temperature and the mass of the coldness accumulating medium disposed adjacent to the outlet of the evaporator is frozen finally. When the surface temperature of the latter mass of the coldness accumulating medium is lowered below the second predetermined level of, for example, $-4°$ C., the control circuit 51 judges the signal from the temperature sensor 8 to emit a "High" level signal to the indicator 54 to lighten the same, which indicates that the freezing of the coldness accumulator 5e has been completed.

When the coldness accumulator surface temperature detected by the temperature sensor 8 is further lowered below the above-mentioned second predetermined level to the first predetermined temperature level of, for example, $-6°$ C., the control circuit 51 judges the signal from the temperature sensor 8 to deenergize the solenoid valve 48, so that the latter is open to connect the return pipe line 46 with the return pipe line 45, whereby a part of the refrigerant flowing through the line 45 flows into and through the return pipe line 46 to the main inlet 21f of the compressor 21. The pressure in the return pipe line 46, therefore, rises to the pressure level of the airconditioning evaporation pressure (2.5 kg/cm$^2$G), so that the expansion valve 5b for the refrigerator evaporator 5d is closed. All the cylinders of the compressor 21 are then operated solely for the purpose of airconditioning. However, because the check valve 5f blocks the entrance of the higher pressure air conditioning refrigerant into the refrigerator evaporator 5d, the temperature therein is kept at a lower level for a while.

The second predetermined temperature level at which the indicator 54 is lightened is set higher than the first predetermined temperature level at which the solenoid valve 48 is opened in order to eliminate a possible problem or inconvenience that the coldness accumulator surface temperature detected by the temperature detector 8 is raised to put out the indicator 54 soon after the solenoid valve 48 is opened.

The coldness accumulated in the coldness accumulating medium keeps the interior of the cool-keeping unit 2 at a low temperature around the freezing temperature of the coldness accumulating medium for a long time even if the vehicle is parked and the engine is stopped.

When the temperature detected by the temperature switch 14 on the refrigerator evaporator 5d is below a predetermined level (0° C. for example) and the ambient temperature detected by the temperature switch 15 on the refrigerator outer surface rises beyond a predetermined level (35° C. for example), the switches 14 and 15 are both closed to energize the motor 10 so that the fan 11 is operated to positively circulate the cooled air through the interior of the refrigerator, i.e., to and from the cooling unit 1 into and from the cool-keeping unit 2. The fan motor 10 is directly electrically connected to the batteries through the switches 14 and 15 and thus will be continuously operated to drive the fan 11 even after the engine is stopped provided that the ambient temperature detected by the temperature switch 15 is above the level predetermined for this switch. However, when the coldness accumulating medium in the coldness accumulator 5e is completely melted, the switch 14 is opened to deenergize the fan motor 10 to prevent undue discharge from the batteries 16. When the ambient temperature detected by the temperature switch 15 is lower than the level preset for this switch, it is kept open to keep the fan motor 10 deenergized.

When the goods to be cooled in the cool-keeping unit 2 have been fully cooled, the cool-keeping unit 2 can be disconnected from the cooling unit 1. Then, the lids 4 are attached to the cool-keeping unit 2 to close the openings 18a and 18b, as shown in FIG. 3, so that the cool-keeping unit 2 becomes portable away from the vehicle.

If it is desired to cool only the interior of the vehicle, the refrigerator switch 53 will be kept open to keep the solenoid valve 48 open to assure that the refrigerant is circulated only through the airconditioning evaporator 25 and all the cylinders of the compressor 21 utillized solely for the airconditioning purpose.

The embodiment described above can be modified as follows:

(1) The refrigerating compression section 21b of the compressor 21 may be formed by a plurality of cylinders rather than by a single cylinder as in the described embodiment;

(2) The temperature sensor 8 may detect the temperature of air in the refrigerator rather than the surface temperature of the coldness accumulator 5e and, in addition, may be formed by a temperature switch such as a lead switch rather than the thermistor described;

(3) The pressure reduction means for the refrigerating circuit may be either a conventional temperature responsive expansion valve or a combination of a solenoid valve and a fixed restriction orifice rather than the fixed-pressure expansion valve 5b described; and (4) The coldness accumulating medium may be any conventional eutectic solution having a freezing point below 0° C. rather than water as in the described embodiment.

Other embodiments will be described with reference to FIGS. 13 through 26.

Figure 15:
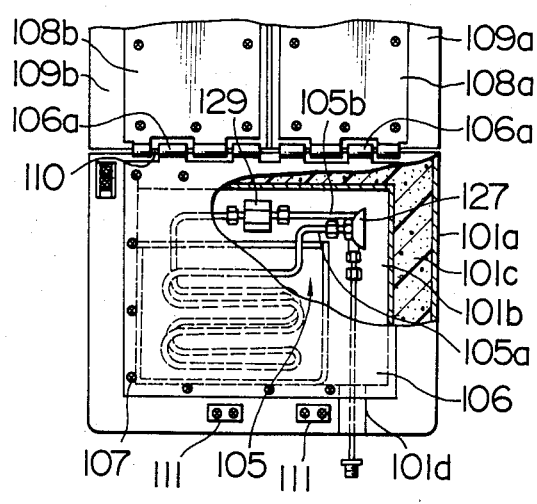
FIG. 15 is a partially sectional front elevation of the cooling unit.

Referring to FIGS. 13 to 16, a refrigerator comprises a cooling unit 100 and a cool-keeping unit 102. The cooling unit 100 has a casing 101a of a moulded plastic material filled with a heat insulating material 101c such as foamed hard urethane. The casing 101a defines therein a recess 101b which accommodates a container 103 of a heat conductive material such as aluminium. The container 103 contains an amount of coldness accumulating medium (distilled water) and an evaporator 105 comprising a plurality of zigzag turns of aluminium tube extending in the container 103 in heat exhange relationship with the water. The inlet and outlet 105a and 105b of the evaporator are connected with a fixed-pressure expansion valve 127 and with a check valve 129, respectively, and extend through holes 101d (one of which is shown in FIG. 15) formed in the bottom wall of the casing 101a. The evaporator inlet and outlet are connected to an airconditioning refrigeration cycle similar to one described previously.

One of the faces of the container 105 is disposed in the opening of the recess 101b and in heat exhange relationship with a cooling plate 106 of a heat conductive metal such as aluminium secured to the casing 101a by screws 107. The cooling plate 106 extends to an upper edge of the casing 101a where the plate 106 is pivotally connected by hinges 106a to mounting plates 108a and 108b disposed in side-by-side relationship, as best seen in FIG. 15. It will be seen in FIG. 15 that the hinges 106a are formed partly by rolled tabs integral with the cooling plate 106, partly by rolled similar tabs integral with the mounting plates 108a and 108b and partly by a shaft 110. The mounting plates 108a and 108b are secured to doors 109a and 109b in face-to-face contacting relationship thereto. Thus, when the cooling plate 106 is cooled, the coldness is transferred through the hinges 106a to the mounting plates 109a and 109b.

The doors 109a and 109b are of a heat insulating structure of a moulded plastic material, as in the first embodiment of the invention, and filled with heat insulating material 101c such as foamed hard urethane. The provision of the two doors 109a and 109b rather than a single larger door is advantageous in that one of the two doors can be opened for the insertion and removal of goods to be cooled into and out of the refrigerator even if it is installed in a relatively small or narrow space in a vehicle.

Figure 16:
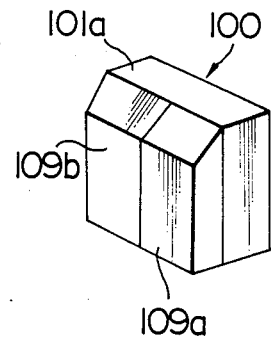
FIG. 16 is a perspective view of the cooling unit when the front face of the unit is covered with lids.
Figure 17:
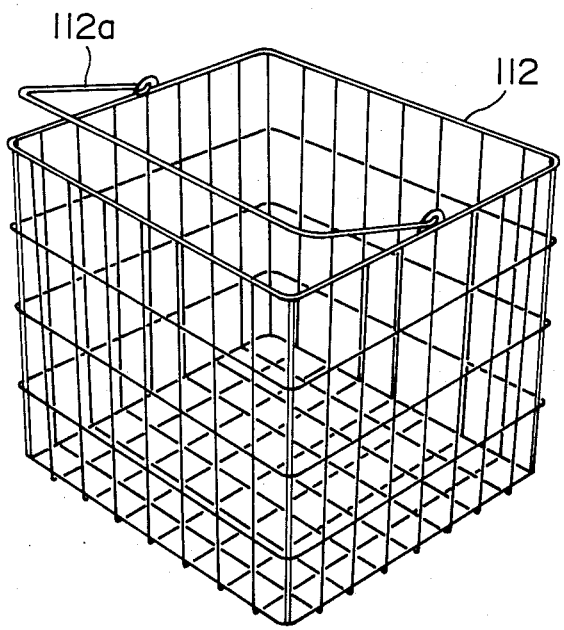
FIG. 17 is a perspective view of a goods basket for use in the cool-keeping container.

The doors 109a and 109b are adapted to be moved over the cool-keeping unit 102 to close an opening 102b therein when the unit 102 is connected to the cooling unit 100, whereby the interior of the cool-keeping unit can be thermally isolated from outside thereof. When the cool-keeping unit 102 is disconnected from the cooling unit 100, the doors 109a and 109b cover the outer surface of the cooling plate 106, as shown in FIG. 16. Magnet pieces are embedded in the doors 109a and 109b adjacent to the free ends thereof. Iron pieces 111 are secured to the lower end of the casing 101a and to the upper ends of an outer frame or casing 102a of the cool-keeping unit 102. Thus, the doors 109a and 109b are magnetically held either on the casing 101a or on the casing 102a. Heat insulating packings (not shown) are secured to the side edge faces of the doors 109a and 109b which are disposed in side-by-side relationship so that, when the doors close the opening 102b in the cool-keeping unit 102, the packings cooperate with the doors to guard the interior of the cool-keeping unit 102 against heat and forign matters.

The casing 102a of the cool-keeping unit 102 is of a heat insulating structure as in the first embodiment of the invention and provided with a second opening 102c formed in the side face which is adapted to be brought into contact with the cooling plate 106 of the cooling unit 100. A basket 112 is normally placed in the cool-keeping unit 102 and removable therefrom through the first opening 102b. The basket 112 is formed by wires or thin metal rods formed into the shape shown in FIG. 17 and coated with a plastic material. A handle 112a is pivotally connected to the opposite sides of the open top of the basket.

Figure 18:
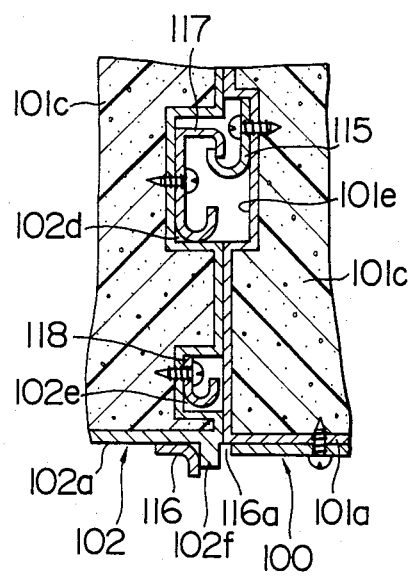
FIG. 18 is an enlarged fragmentary sectional view of the refrigerator showing detachable connection between the cooling unit and the cool-keeping container.
Figure 19:
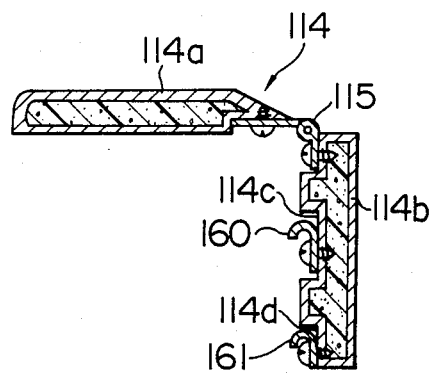
FIG. 19 is a sectional view of hinged lids for the cool-keeping container.
Figure 20:
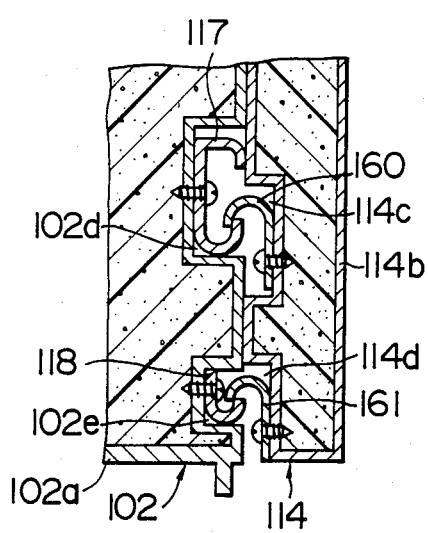
FIG. 20 is an enlarged fragmentary sectional view of the cool-keeping container and a lid therefor showing detachable connection therebetween.

FIG. 18 illustrates means for detachably connecting the cool-keeping unit 102 to the cooling unit 100. The connecting means includes J-shaped engagement members 115 of a stainless steel only one of which is shown in FIG. 18. Such engagement members 115 are secured by screws to the bottom faces of recesses 101e (only one of which is shown) formed in the face of the cooling unit casing 101a to be contacted by the cool-keeping container 102. The recesses 101e are disposed along the opposite side edges of the face of the cooling unit casing. A flat or planar engagement member 116 is secured to the bottom of the cooling unit casing 101a along the front bottom edge thereof and is formed with cutouts or slots 116a. Recesses 102d (only one of which is shown in FIG. 18) are formed in the face of the cool-keeping unit casing 102a which is adapted to be brought into contact with the front face of the cooling unit casing 101a. The recesses 100d are so positioned as to be aligned with the recesses 101e when the two casings 101a and 102a are connected together. Additional recesses 102e (only one of which is shown in FIG. 18) are also provided below the recesses 101d. An engagement member 117 having generally U-shaped top and bottom ends is secured to the bottom face of each of the recesses 101d. Another engagement member 118 having a generally U-shaped bottom end is secured to the bottom face of each of the recesses 102e. Projections 102f are formed on the bottom of the cool-keeping unit casing 102a along the bottom edge below the recesses 102e and are so positioned as to be aligned with the slots 116a.

When it is desired to connect the cool-keeping unit 102 to the cooling unit 100, the cool-keeping unit 102 will be moved into a position in which the projections 102f are received in the slots 116a. Then, the unit 102 may be angularly moved until the downwardly turned ends of the engagement members 117 on the unit 102 are snapped into locking engagement with the upwardly turned ends of the engagement members 115 on the unit 100. When it is desired to disconnect the unit 102 from the unit 100, the unit 102 may simply be forced away from the unit 100 to resiliently unlock the members 115 and 117.

The engagement members 115, 117 and 118 may be formed of a moulded plastic material.

A packing (not shown) is applied to the cooling plate 106 of the cooling unit casing 101a along the outer periphery of the plate so that, when the cool-keeping unit 102 is connected to the cooling unit 100, the packing cooperates with the mating surface of the cool-keeping unit casing 102a to form a substantially fluid-tight seal therebetween.

Figures 13, 14:
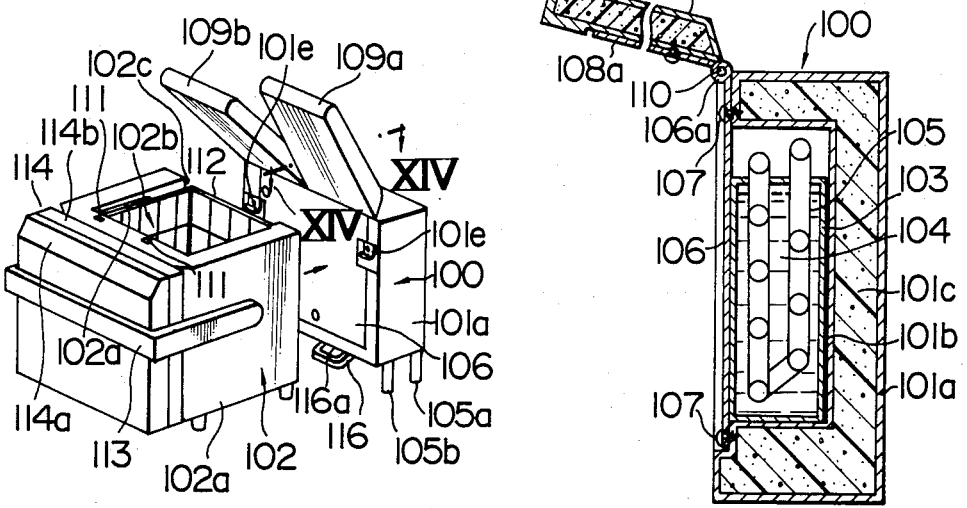
FIG. 13 is a perspective view of another embodiment of the refrigerator with the cool-keeping container being shown in disconnected position.
FIG. 14 is an enlarged vertical sectional view of the cooling unit taken along line XIV—XIV in FIG. 13.
Figure 21:
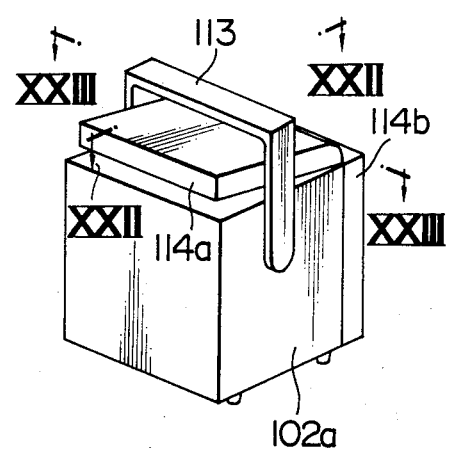
FIG. 21 is a perspective view of the cool-keeping container with the lids thereon.

A handle 113 is pivotally connected to the lateral sides of the cool-keeping unit casing 102a, as shown in FIG. 13. When the cool-keeping unit 102 is connected to the cooling unit 100, the handle 113 is moved or rotated to a horizontal position in which a lateral grip of the handle 113 cooperates with an adjacent side of the cool-keeping unit 102 to define a space in which a lid means 114 fabricated independently of the cool-keeping unit casing 102a is adapted to be held stationary. As will be seen in FIG. 19, the lid means 114 comprises first and second lids 114a and 114b which are both made of a moulded plastic material and filled with a heat insulating material such as foamed plastic material, as is the cool-keeping unit casing 102a, and are pivotally connected together by a hinge 115. The lids 114a and 114b are respectively adapted to close the first and second openings 102b and 102c in the cool-keeping unit casing 102a when it is disconnected from the cooling unit 100 to thermally isolate the interior of the cool-keeping unit 102 from outside thereof. For this purpose, the cool-keeping unit 102 includes means for detachably securing the lid means 114 to the cool-keeping unit casing 102a. The securing means are partly formed by the engagement members 117 and 118 which also form a part of the means for detachably connecting the cooling unit 100 and the cool-keeping unit casing 102a together, as described previously. The inner surface of the lid 114b is formed therein with recesses 114c and 114d so positioned as to be aligned with the recesses 102d and 102e in the casing 102 when the lid 114 is placed over the casing 102a in position, as will be seen in FIG. 20. Engagement members 160 and 161 each having an inverted J-shape and made of a stainless steel are secured to the bottoms of the recesses 114c and 114d and adapted to be brought into locking engagement with the engagement members 117 and 118 on the cool-keeping unit casing 102a when the lid 114b is placed in position relative to the casing 102a. FIG. 21 shows the lid 114a when it is detachably secured to the cool-keeping unit casing 102a, the other lid 114a being shown as being slightly open. Packings (not shown) are secured to the inner surfaces of the lids 114a and 114b along their outer peripheries and adapted to cooperate with the mating surfaces of the cool-keeping unit casing 102a to form seals therebetween.

Figure 22:
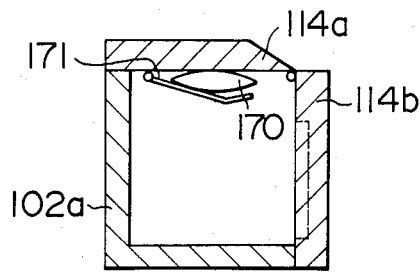
FIGS. 22 and 23 are sections of a modification of the cool-keeping container taken along lines XII—XII and XIII—XIII in FIG. 21, respectively.
Figure 23:
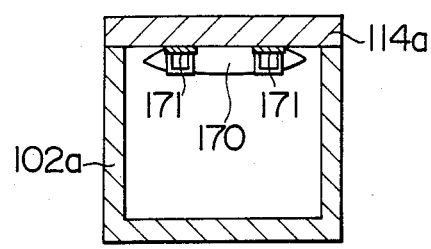

FIGS. 22 and 23 show a modification to the lid 114a. The modification comprises a package 170 of a coldness accumulating medium having a sol-gel change characteristic. The package 170 is held against the inner surface of the lid 114a by means of a pair of resilient leaf springs 171.

When the refrigerator is operated, the cooling system 105 cools not only the coldness accumulating medium 104 in the cooling unit 100 but also the coldness accumulating medium package 170. Thus, when the cool-keeping unit 102 is separated from the cooling unit 100, the coldness accumulating medium package 170 is operative to keep the interior of the cool-keeping unit casing 102a at a low temperature.

Figure 24:
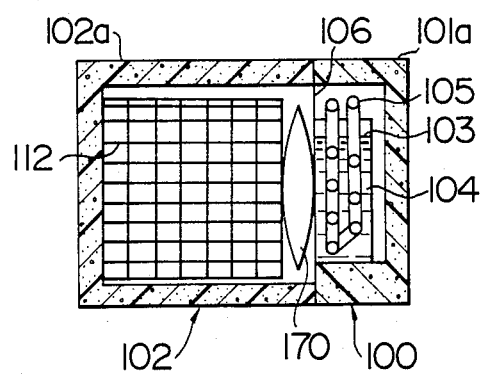
FIG. 24 is a sectional view of a modified refrigerator.

As shown in FIG. 24, the coldness accumulating medium package 170 may alternatively be placed in the refrigerator between the goods basket 112 and the cooling plate 106 and in heat exchange relationship therewith so that the coldness accumulating medium package 170 can be cooled to its freezing temperature during the operation of the refrigerator. The package 170 can be placed in the cool-keeping unit casing 102a after the same has been disconnected from the cooling unit 100 to keep the interior of the casing 102a at a low temperature for long time.

Figure 25:
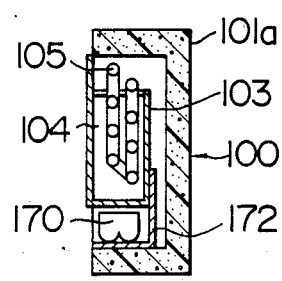
FIG. 25 is a sectional view of a cooling unit of a further modified refrigerator.

Further alternatively, as shown in FIG. 25, the coldness accumulating medium package 170 may be removably placed under the coldness accumulating medium container 103 in the cooling unit 100 and on and in heat exchange relationship with a metallic plate 172 having a good heat transfer characteristic and disposed in heat conductive relationship with the container 103. When the cool-keeping unit 102 is disconnected from the cooling unit 100, the package 170 may be removed from the unit 100 and placed in the cool-keeping unit casing 102a. An ice-making tray (not shown) amy be substituted for the package 170.

Figure 26:
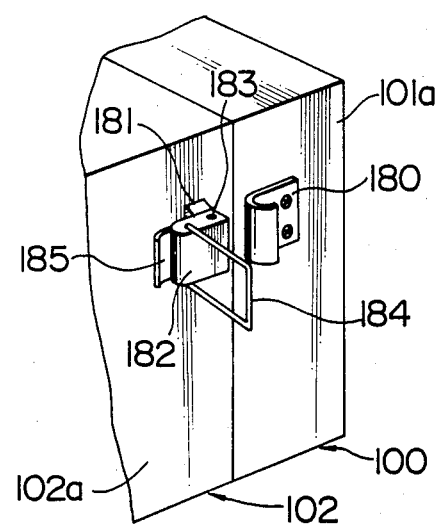
FIG. 26 is a fragmentary perspective view of the modified refrigerator showing detachable connection between the cooling unit and the cool-keeping container.
Figure 27:
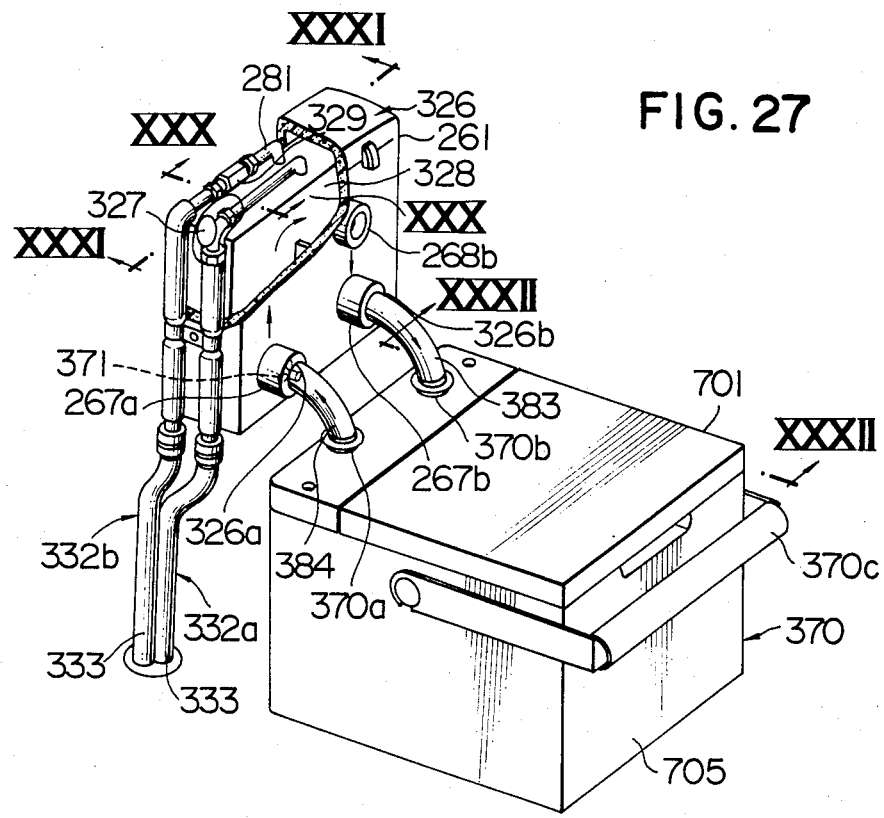
FIG. 27 is a partially sectional perspective view of a further modified refrigerator.

FIG. 26 shows a modification to the means for detachably secureing the cool-keeping unit 102 to the cooling unit 100. The modification comprises a pair of clamps only one of which is shown. Each clamp is formed by a first clamp member 180 of a J-shaped section secured to one side face of the cooling unit casing 101a, a bracket 181 secured to the associated side face of the cool-keeping unit casing 102a, a buckle member 182 pivotally connected to the bracket 181 by a pin 183, and a U-shaped link member 184 pivotally connected at its open end to the buckle member 182. The buckle member 182 is rotatable to bring the closed end of the U-shaped link member 184 into locking engagement with the bent end of the clamp member 180 on the cooling unit casing 101a. The link member 182 may be released from the clamp member 180 by operating a tongue 185 attached to the buckle member 182 to rotate the same.

The embodiment described with reference to FIGS. 13-26 may further be modified as follows:

(1) The first and second openings 102b and 102c may be separated from each other rather than being continuous as in the described embodiment and the first opening 102 may be formed in a front or lateral side wall of the cool-keeping unit casing 102a rather than in the top as in the described embodiment; and (2) The doors 109a and 109b may be fabricated independently of the cooling unit casing 101a rather than being hinge-connected thereto and may be detachably connected to the casing 101a as is the lid means 114 to the cool-keeping unit casing 102a.

Figure 30:
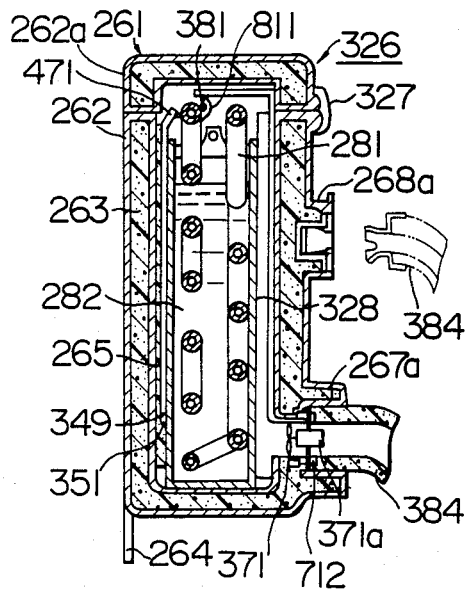
FIG. 30 is a section of the further modified refrigerator taken along line XXX—XXX in FIG. 27.
Figure 31:
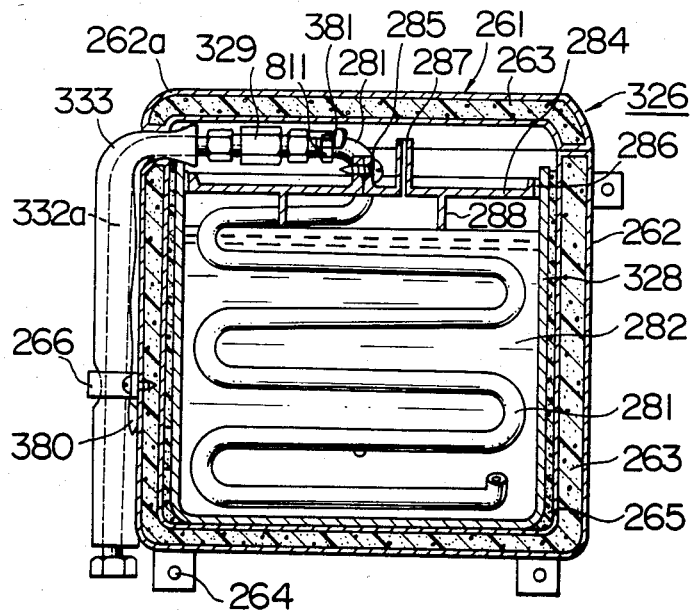
FIG. 31 is a section of the further modified refrigerator taken along line XXXI—XXXI in FIG. 27.

FIGS. 27 to 32 show a further embodiment of the invention which includes a cooling unit 326 including a casing 261 of a heat insulating structure surrounding a coldness accumulating container 328 made of a heat conductive material such as aluminium. A refrigerator evaporator 281 is disposed in the container 328 in heat exchange relationship with a coldness accumulating medium 282 such as water contained in the container, as shown in FIGS. 30 and 31. The evaporator 281 is connected to refrigerant inlet and outlet pipings 332a and 332b which in turn are connected to a refrigeration cycle similar to one described with reference to FIG. 11.

Air passages 326a and 326b are formed in the front wall of the cooling unit casing 261 and forwardly extended by cylindrical port members 267a and 267b, respectively. An axial flow type air blower 371 is disposed in the air passage 326a and supported in the port member 267a. The passages 326a and 326b act as air inlet and outlet, respectively.

Figure 32:
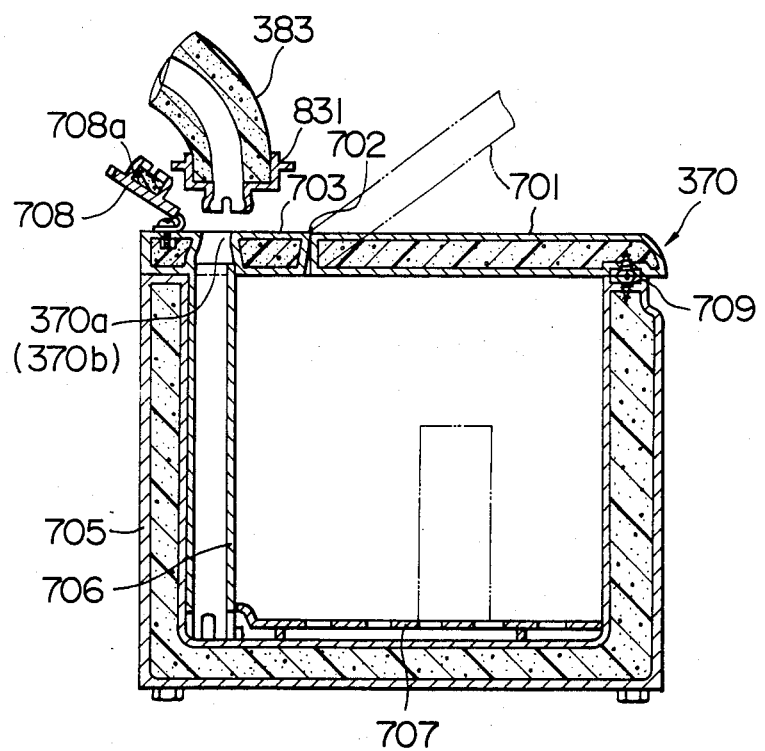
FIG. 32 is a section of the further modified refrigerator taken along line XXXII—XXXII in FIG. 27.

A cool-keeping unit 370 has a casing 705 of a heat insulating structure and is prepared separately of the cooling unit casing 326. The unit 370 also includes a lid 701 which normally closes an opening in the top of the casing 705 and is upwardly openable to provide an access to the interior of the casing 705, as shown by broken lines in FIG. 32. The opening in the top of the casing 705 is partly defined by a top wall 703 in which are formed air outlet and inlet openings 370a and 370b (one of which is shown in FIG. 32) respectively connected to the air passages 326a and 326b in the cooling unit casing 261 by ducts 384 and 383 both of a heat insulating structure, as will be best seen in FIG. 27. The blower 371 is operative to move air through the ducts 383 and 384, as indicated by arrows shown in FIG. 27. The ducts 383 and 384 are detachable from the air inlet and outlet openings 370a and 370b, as will be seen in FIG. 32, so that the cool-keeping unit casing 705 is portable by means of a handle 370c pivotally connected to lateral sides of the casing 705.

Figure 28:
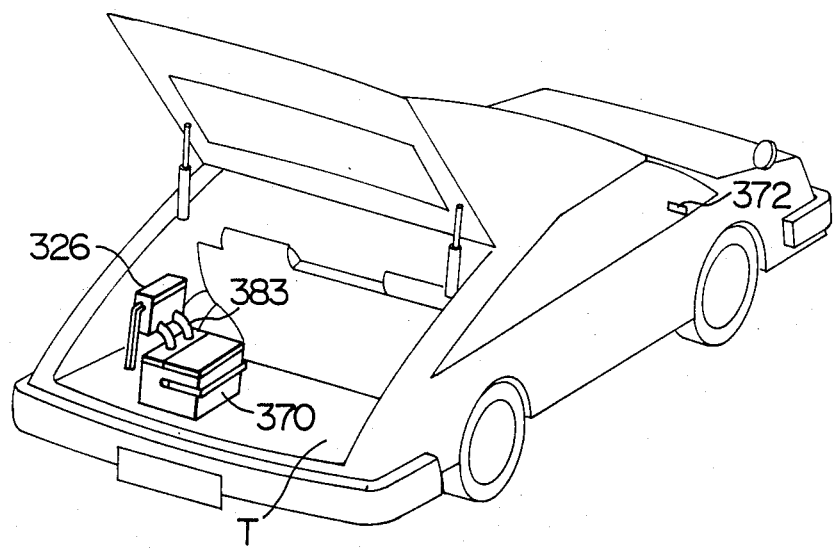
FIG. 28 is a perspective view of a vehicle showing the further modified refrigerator mounted therein.
Figure 29:
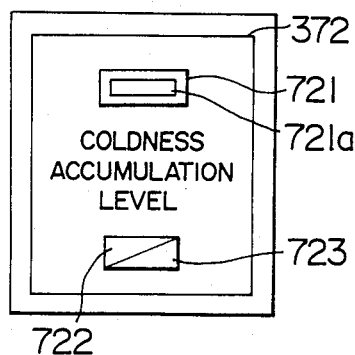
FIG. 29 is an enlarged plan view of an operation panel associated with the further modified refrigerator.

The cooling unit 326 and the cool-keeping unit 370 form a refrigerator which is adapted to be disposed in a space within a vehicle, such as a rear baggage compartment T as will be seen in FIG. 28. The refrigerator includes an operation panel 372 adapted to be placed on an instrument panel of the vehicle. The operation panel 327 carries a refrigeration switch button 721 with an LED 721a therein and a coldness accumulation indicator comprising a pair of LEDs 722 and 723 to be lightened successively or independently according to the coldness level accumulated in the coldness accumulating medium.

FIG. 30 and 31 show the structural details of the cooling unit 326. The cooling unit casing 261 comprises a lower casing section 262 accommodating the coldness accumulating container 328 and an upper casing section 262a closing the open top of the lower casing section 262. The two casing sections 262 and 262a are both of a heat insulating double-walled structure of moulded polypropylene and filled with a heat insulating material such as foamed urethane 263. The casing sections 262 and 262a are secured together by clamps 327 (one of which is shown in FIG. 30) after the coldness accumulating container 328 has been placed in position in the lower casing section 262. A layer of foamed urethane 265 is interposed between the coldness accumulating container 328 and the lower casing section 262 to stationarily support the container in position without using any screws.

The evaporator 281 in the container 328 is formed by a plurality of zigzag turns of a tube of a metal having a good heat conductivity, such as aluminium, and disposed in heat exchange contact with the water 282 contained in the container 328. The container has a lid formed by two lid sections connected together by screws 285 (one of which is shown). Upstanding end portions of the evaporator piping 281 extend upwardly through openings formed between the edges of the lid sections connected by the screws 285 (see FIG. 31). A liquid-tight seal 286 formed by a packing material including tar is disposed between the outer periphery of the lid 284 and the inner periphery of the open top of the container 328. The lid is formed therein with a vent hole 287 (1.5 mm in diameter) and has integral vertical walls 288 extending into the container 328 to minimize the movement of the water in the container.

A temperature sensor 349 in the form of thermistor is disposed in contact with the outer surface of the container 328 and held in this position by silicone-rubber 351 which functions not only as an adhesive but also as a filling material which eliminates any gap or space between the outer surface of the container 328 and the temperature sensor 349 to facilitate a good heat transfer therebetween. The temperature sensor 349 is surrounded by the foamed urethane layer 265 which in turn is held against the container 328 by the inner surface of the lower casing section 262. This structure is effective to thermally isolate the temperature sensor 349 from outside of the cooling unit casing 261.

The temperature sensor 349 is electrically connected with electrical conductors 471 which extend outwardly from the cooling unit casing 261 at the point where the evaporator inlet and outlet pipings 332a and 332b extends outwardly from the casing 261. A lead switch 381 is mounted by a clamp 811 on the evaporator tube at the outlet of the evaporator 281. The inlet and outlet pipings 332a and 332b of the evaporator are covered with insulating tubes 333 and secured by a clamp 266 to the cooling unit casing 261 together with the insulating tubes 333 and a lead switch 380 which has contacts adapted to be closed when the temperature around the cooling unit casing 261 rises beyond 13° C. The lead switch 281 is adapted to be closed when the surface temperatue of the evaporator tube at the outlet thereof is lowered below 6° C. The two lead switches 380 and 381 are electrically connected in series to a motor 371a mounted by a screw 712 in the air inlet port 267a on the cooling unit casing 261 and drivingly connected to the blower 371 previously mentioned.

Duct holders 268a and 268b are provided on the cooling unit casing 261 above the air inlet and outlet ports 267a and 267b and adapted to receive or hold the lower ends of the air ducts 383 and 384 when the cool-keeping unit 370 is disconnected from the cooling unit 326, i.e., from the lower ends of the ducts 383 and 384. The cooling unit casing 261 is further provided with brackets 264 (only one of which is shown in FIG. 30) by which the cooling unit 326 is secured to the vehicle body.

The cool-keeping unit casing 705 is also formed by a moulded plastic material of a heat insulating double-walled structure and filled with a heat insulating material. The top wall 703 is also formed by a moulded plastic material of a heat insulating double-walled structure and filled with a heat insulating material. The top wall is fixed to the casing 705 by screws (not shown) and integrally connected to the lid 701 by a flexible web integral therewith. A magnet piece or pieces are secured to the inner surface of the lid 701 adjacent to the free edge thereof and adapted to cooperate with magnetic pieces secured to the top of the casing 705 so that the lid is held in closed position.

The air inlet and outlet openings 370a and 370b formed in the top wall 703 are inwardly diverging so that plastic connectors 831 secured to the free or lower end of the air ducts 383 and 384 can be resiliently snapped into the air inlet and outlet openings 370a and 370b to sealingly connect the ducts to the openings. A vertical air duct 706 extends downwardly from the air inlet opening 370b substantially to the bottom of the casing 705 and has a bottom end held by a drain board on the bottom of the casing 705. The cool-keeping unit 370 further includes opening closures 708 (only one of which is shown in FIG. 32) which, when the ducts 383 and 384 are disconnected from the air inlet and outlet openings 370a and 370b, are moved into sealing engagement with these openings to thermally isolate the interior of the casing 705 from outside thereof. Each closure 708 is provided with heat insulating packing 708a.

Figure 33:
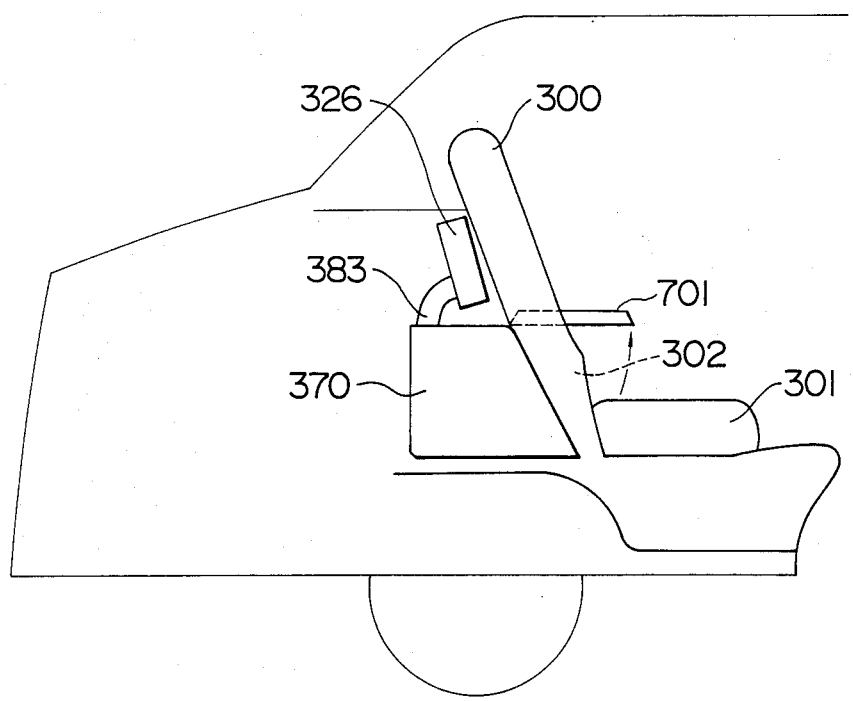
FIG. 33 schematically illustrates a still further modified refrigerator mounted in a vehicle.

Finally, referring to FIG. 33, the cooling unit 326 and the cool-keeping unit 370 may alternatively be installed adjacent to the rear seats 300 of the vehicle such that a part of the rear seats is forwardly turned down to provide an armrest 301 and an open space 302. The cool-keeping unit 370 may alternatively be of the type that has an opening formed in a front or forward side face rather than in the top so that the opening can be disposed in the open space 302.

The refrigeration cycle by which the coldness accumulating medium 282 is cooled may alternatively be of the type that is connected to the refrigerator evaporator 281 at predetermined time intervals.

The operation of the air blower 371 may alternatively be controlled by a timer rather than by the temperature switches 380 and 381 such that the blower motor 371a is deenergized after the lapse of a predetermined time period from the time when the coldness accumulating medium has been completely frozen.

What is claimed is:

1. A refrigerator for a vehicle equipped with an air-conditioner having a refrigeration cycle including a compressor driven by an engine of the vehicle, a condenser connected to a discharge side of said compressor and operative to cool and condense refrigerant from said compressor, an air-conditioner pressure reducing means connected to a discharge side of said condenser and operative to reduce the pressure of the thus condensed refrigerant and expand the same, and an air-conditioner evaporator disposed between a discharge side of said pressure reducing means and a suction side of said compressor and operative to evaporate the thus expanded refrigerant, said refrigerator comprising:

a cooling unit including a casing of a heat-insulating structure, a refrigerator expansion means disposed in said casing and connected to said refrigeration cycle in parallel relationship to said air-conditioner pressure reducing means, a refrigerator evaporator disposed in said casing and having an inlet connected to a discharge side of said refrigerator expansion means and an outlet communicated with a suction side of said compressor, a coldness-accumulating medium to be cooled by said refrigerator evaporator, and means in said casing for supporting said coldness-accumulating medium in heat exchange relationship with said refrigerator evaporator;

said cooling unit being adapted to be secured to the vehicle body;

a portable cool-keeping container of a heat-insulating structure adapted to be detachably connected to said cooling unit and removably accommodate goods to be cooled; and means for transferring the coldness from said cooling unit casing into said cool-keeping container when the latter is connected to said cooling unit and the refrigerator is in operation.

2. A refrigerator according to claim 1, wherein said coldness transferring means include a first opening in said cooling unit and a second opening in said cool-keeping container, said cooling unit and said cool-keeping container being adapted to be detachably secured together such that said first and second openings are substantially aligned to form an air-flow passage.

3. A refrigerator according to claim 2, wherein said cool-keeping container includes a lid for closing said second opening when said cool-keeping container is disconnected from said cooling unit.

4. A refrigerator according to claim 2, wherein said coldness transferring means further include means for positively circulating air through said air-flow passage when said cooling unit and said cool-keeping container are connected together.

5. A refrigerator according to claim 3, wherein said cool-keeping container is provided with an additional opening for the insertion of goods to be cooled into said container and for the removal of cooled goods from said container and an additional lid for closing said additional opening.

6. A refrigerator according to claim 1, wherein said supporting means comprises a pair of substantially zig-zag turns of a refrigerant piping disposed in said cooling unit casing to form said evaporator and a package of a heat conductive material containing said coldness accumulating medium and disposed in heat exchange relationship with and held between said turns of said refrigerant piping.

7. A refrigerator according to claim 1, wherein said coldness transferring means include a heat-conductive wall provided in a side of said cooling unit casing and disposed in heat-exchange relationship with said coldness-accumulating medium in said cooling unit casing, and an opening in said cool-keeping container, said cooling unit casing and said cool-keeping container being adapted to be detachably secured together so that said heat-conductive wall and said opening are substantially aligned.

8. A refrigerator according to claim 7, wherein said cool-keeping container includes a lid for closing said opening when said cool-keeping container is disconnected from said cooling unit.

9. A refrigerator according to claim 8, wherein said cool-keeping container is provided with an additional opening for the insertion of goods to be cooled into said cool-keeping container and for the removal of cooled goods from said cool-keeping container and an additional lid for closing said additional opening.

10. A refrigerator according to claim 9, wherein the first-said lid and said additional lid are foldably connected together by hinge means.

11. A refrigerator according to claim 8, wherein said cool-keeping container is provided with an additional opening for the insertion of goods to be cooled into said cool-keeping container and for the removal of cooled goods, said refrigerator further including means for closing said additional opening when said cool-keeping container is connected to said cooling unit and said refrigerator is in operation.

12. A refrigerator according to claim 11, wherein said closing means comprises a door hinge-connected to said cooling unit and having a heat-conductive surface of a heat-conductive material disposed in heat-transferring relationship with said heat-conductive wall of said cooling unit casing, said heat-conductive surface being so positioned as to be directed to the interior of said cool-keeping container when said door is positioned to close said additional opening in said cool-keeping container.

13. A refrigerator according to claim 12, wherein said door and said heat-conductive wall are disposed such that, when said cool-keeping container is disconnected from said cooling unit, said door can be pivotally moved into closely opposed relationship with said heat-conductive wall.

14. A refrigerator according to claim 7, wherein said supporting means comprises a substantially closed metallic container in which said coldness accumulating medium and said refrigerating evaporator are disposed in heat exchange relationship, said metallic container having an outer surface disposed in heat exchange relationship with said heat-conductive wall of said cooling unit casing.

15. A refrigerator according to claim 7, wherein said cool-keeping container includes a package of coldness accumulating medium removably disposed therein.

16. A refrigerator according to claim 1, wherein said supporting means comprises a substantially closed container of a heat-conductive material in which said coldness accumulating medium and said refrigerating evaporator are disposed in heat exchange relationship, said substantially closed container being disposed in said cooling unit casing such that an air space is defined therebetween, and wherein said coldness transferring means comprises air duct means defining therein air passages, said cooling unit casing and said cool-keeping container being provided with ports to be communicated with each other by said air duct means whereby said air space in said cooling unit casing is communicated through said air passages with the interior of said portable cool-keeping container, said cool-keeping container being detachable from said air duct means.

17. A refrigerator according to claim 16, wherein said coldness transferring means further includes means for positively circulating air through said air passages when said cool-keeping container is connected by said air duct means to said cooling unit casing, said air circulating means including an electrically operable fan mounted on said cooling unit and so disposed as to cause air to flow in one direction through one of said air passages and in the opposite directed through the other air passage.

18. A refrigerator according to claim 16, wherein said cool-keeping containe is provided with an opening for the insertion of goods to be cooled into said cool-keeping container and for the removal of cooled goods therefrom and a lid for normally closing said opening.

19. A refrigerator according to claim 18, wherein said air circulating means further including an additional air duct means disposed in said cool-keeping container and extending therein from one of the ports of said cool-keeping container toward the bottom thereof.

20. A refrigerator for a vehicle equipped with an air-conditioner having a refrigeration cycle, said refrigerator comprising:
a cooling unit including a casing of a heat-insulating structure, a refrigerator evaporator disposed in said casing and adapted to be connected to said air-conditioner refrigeration cycle, a coldness-accumulating medium to be cooled by said refrigerator evaporator, and means in said casing for supporting said coldness-accumulating medium in heat exchanger relationship with said refrigerator evaporator;
said cooling unit being adapted to be secured to the vehicle body;
a portable cool-keeping container of a heat-insulating structure adapted to be detachably connected to said cooling unit and removably accommodate goods to be cooled; and
means for transferring the coldness from said cooling unit casing into said cool-keeping container when the latter is connected to said cooling unit and the refrigerator is in operation, including
a first opening in said cooling unit and a second opening in said cool-keeping container, said cooling unit and said cool-keeping container being adapted to be detachably secured together such that said first and second openings are substantially aligned to form an air-flow passage,
a lid for closing said second opening when said cool-keeping container is disconnected from said cooling unit, and
an additional opening in said cool-keeping container for the insertion of goods from said container and an additional lid for closing said additional opening, the first-said lid and said additional lid being foldably connected together by hinge means.

21. A refrigerator for a vehicle equipped with an air-conditioner having a refrigeration cycle, said refrigerator comprising:
a cooling unit including a casing of a heat-insulating structure, a refrigerator evaporator disposed in said casing and adapted to be connected to said air-conditioner refrigeration cycle, a coldness-accumulating medium to be cooled by said refrigerator evaporator, and means in said casing for supporting said coldness-accumulating medium in heat exchange relationship with said evaporator;
said cooling unit being adapted to be secured to the vehicle body;
a portable cool-keeping container of a heat-insulating structure adapted to be detachably connected to said cooling unit and removably accommodate goods to be cooled; and means for transferring the coldness from said cooling unit casing into said cool-keeping container when the latter is connected to said cooling unit and the refrigerator is in operation, including a first opening in said cooling unit and a second opening in said cool-keeping container, said cooling unit and said cool-keeping container being adapted to be detachably secured together such that said first and second openings are substantially aligned to form an air-flow passage, means for positively circulating air through said air-flow passage when said cooling unit and said cool-keeping container are connected together, and an additional opening in said cool-keeping container for the insertion of goods to be cooled into said container and for the removal of cooled goods to be cooled into said container and for the removal of cooled goods from said container, said refrigerator further including means for closing said additional opening when said cool-keeping container is connected to said cooling unit and said refrigerator is in operation, and wherein said air circulating means includes an electrically driven fan mounted on said closing means.

22. A refrigerator according to claim 21, wherein said closing means comprises a door member hinge-connected to said cooling unit and adapted to close said first opening when said cool-keeping container is disconnected from said cooling unit.

* * * * *